United States Patent
Hoffmann et al.

(10) Patent No.: US 11,591,438 B2
(45) Date of Patent: Feb. 28, 2023

(54) PROCESS OF PROCESSING A RADIATION-CURABLE THIOLEN BASED COMPOSITION WITH ADDITIVE-MANUFACTURING TECHNOLOGY

(71) Applicant: 3M INNOVATIVE PROPERTIES COMPANY, St. Paul, MN (US)

(72) Inventors: Henning Hoffmann, Windach (DE); Peter U. Osswald, Tuerkheim (DE); Joachim W. Zech, Kaufering (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 267 days.

(21) Appl. No.: 17/056,189

(22) PCT Filed: May 20, 2019

(86) PCT No.: PCT/IB2019/054158
§ 371 (c)(1),
(2) Date: Nov. 17, 2020

(87) PCT Pub. No.: WO2019/224699
PCT Pub. Date: Nov. 28, 2019

(65) Prior Publication Data
US 2021/0214504 A1    Jul. 15, 2021

(30) Foreign Application Priority Data
May 22, 2018    (EP) ..................................... 18173509

(51) Int. Cl.
*B33Y 70/00*    (2020.01)
*C08G 75/045*    (2016.01)
(Continued)

(52) U.S. Cl.
CPC .............. *C08G 75/045* (2013.01); *A61C 7/08* (2013.01); *B33Y 70/00* (2014.12); *B33Y 80/00* (2014.12);
(Continued)

(58) Field of Classification Search
CPC .............................. B33Y 70/00; C08G 75/045
See application file for complete search history.

(56) References Cited

U.S. PATENT DOCUMENTS

| | | | |
|---|---|---|---|
| 4,737,593 | A | 4/1988 | Ellrich |
| 5,100,929 | A | 3/1992 | Jochum |
| 5,167,882 | A | 12/1992 | Jacobine |
| 10,471,653 | B2 | 11/2019 | Selbertinger |
| 2010/0304338 | A1 | 12/2010 | Cramer |

(Continued)

FOREIGN PATENT DOCUMENTS

| | | |
|---|---|---|
| CN | 104725538 A | 6/2015 |
| CN | 107641200 | 1/2018 |

(Continued)

OTHER PUBLICATIONS

Cole, "Thiol-Ene Functionalized Siloxanes for Use as Elastomeric Dental Impression Materials", Dental Materials, 2014, vol. 30, No. 04, pp. 449-455.

(Continued)

*Primary Examiner* — James Sanders

(57) ABSTRACT

The invention relates to a process of processing a radiation-curable composition with an additive-manufacturing technique comprising a radiation-curing step, the radiation-curable composition comprising mercapto-functional Component A comprising at least three mercapto moieties, crosslinker Component B with at least three vinyl or allyl moieties, photo-initiator(s) Component C for initiating a curing reaction between Component A and Component B, wherein the radiation-curable composition does not com-
(Continued)

prise urethane (meth)acrylate oligomers in an amount of more than 4 wt. % with respect to the whole composition. 3-dim articles which can be produced are typically transparent and have adequate mechanical properties. The radiation-curable composition is in particular useful for producing clear-tray aligners for dental and orthodontic purposes.

13 Claims, 1 Drawing Sheet

(51) Int. Cl.
    *B33Y 80/00*     (2015.01)
    *A61C 7/08*     (2006.01)
    *C08F 283/12*     (2006.01)
    *B33Y 10/00*     (2015.01)
    *B29C 64/124*     (2017.01)
    *B33Y 70/10*     (2020.01)

(52) U.S. Cl.
    CPC .......... *C08F 283/12* (2013.01); *B29C 64/124* (2017.08); *B33Y 10/00* (2014.12); *B33Y 70/10* (2020.01)

(56) References Cited

U.S. PATENT DOCUMENTS

| | | |
|---|---|---|
| 2012/0256338 A1 | 10/2012 | Bowman |
| 2014/0216649 A1 | 8/2014 | Woods |
| 2016/0145392 A1 | 5/2016 | Toda |
| 2017/0000705 A1 | 1/2017 | Piccardi |
| 2017/0007362 A1 | 1/2017 | Chen |
| 2017/0291357 A1 | 10/2017 | Fong |

FOREIGN PATENT DOCUMENTS

| | | |
|---|---|---|
| EP | 0492953 | 7/1992 |
| GB | 2524454 | 9/2015 |
| WO | WO 2015-069454 | 5/2015 |
| WO | WO 2015-143258 | 9/2015 |
| WO | WO 2016-044547 | 3/2016 |
| WO | 2016104388 A1 | 6/2016 |

OTHER PUBLICATIONS

International Search Report for PCT International Application No. PCT/IB2019/054158, dated Sep. 18, 2019, 4 pages.

Fan et al., Introduction to Intelligent Manufacturing Technology, edited by Junyan Fan and Jiangling Fan, Huazhong University of Science and Technology Press, p. 122, Mar. 2019 (includes English translation).

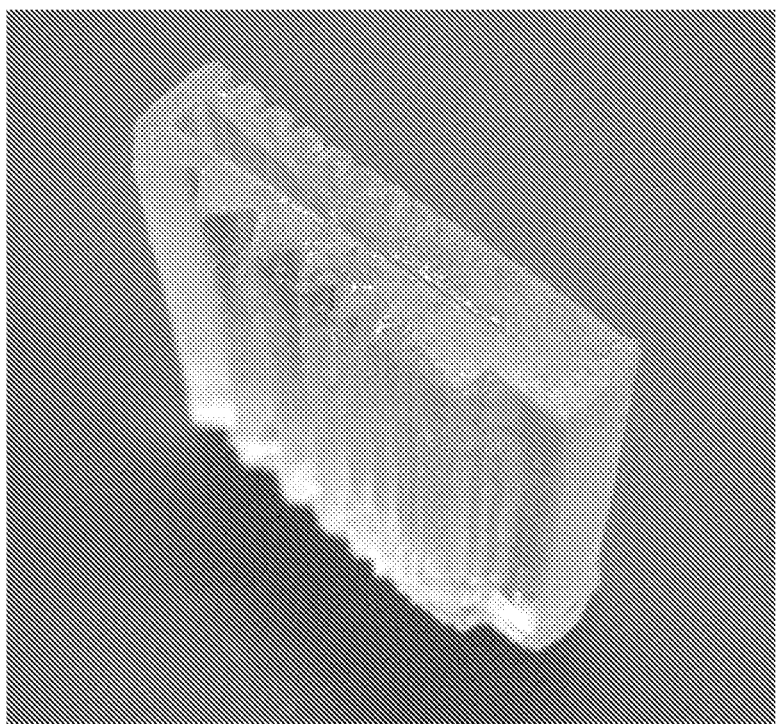

PROCESS OF PROCESSING A RADIATION-CURABLE THIOLEN BASED COMPOSITION WITH ADDITIVE-MANUFACTURING TECHNOLOGY

CROSS REFERENCE TO RELATED APPLICATIONS

This application is a national stage filing under 35 U.S.C. 371 of PCT/IB2019/054158, filed May 20, 2019, which claims the benefit of European Application No. 18173509.3, filed May 22, 2018, the disclosure of which is incorporated by reference in its/their entirety herein.

FIELD OF THE INVENTION

The invention relates to a process of processing a radiation-curable composition with additive-manufacturing technology, in particular by 3d-printing technology.
The radiation-curable composition is in particular useful for producing clear-tray aligners for dental and orthodontic purposes.

BACKGROUND

Thiol-ene based formulations for dental use are generally known.
U.S. Pat. No. 5,100,929 (Jochum et al.) describes visible light curable hard or elastic dental materials based on organic polythiols and organic poly-enes and acyl-phosphine as photo-initiator. Specific examples given are trimethylolpropan tris(mercaptoundecanoat) or pentaerythritol tetrakis(mercaptopropionate) in combination a diallylfunctionalized ethyleneglycol butylene glycol copolymer or triallyltriazintrion and an acyl phosphine photo-initiator.
US 2010/0304338 A1 (Cramer et al.) describes UV curable elastomeric impression materials based on thiolfuntioncalized polysiloxanes and vinlyfunctional materials in combination with a radical initator. Examples given only describe the usage of vinlyether such as triethyleneglycol divinyl ether or multifunctional polyester vinyl ether.
WO 2015/069454 (Dow Corning) describes a shear-thinning UV curable composition of mercapto-functionalized silicones in combination with a silicone based and one organic vinyl component resulting in optically clear materials. The application also includes a method of ink-jet printing such formulations.
U.S. Pat. No. 5,167,882 (Jacobine et al.) describes a stereolithography method for building a 3-dim article, wherein the liquid resin is a thiol/ene formulation comprising a first component having a plurality of norbornene groups and a second component having a plurality of thiol groups.
US 2017/0291357 (Fong et al.) describes thiolen/ene based inks in combination with 5 to 60 wt. % oligomeric (meth)acrylates for use in stereolithography.
US 2017/0007362 A1 (Align Technology) describes a crosslinked polymer useful in orthodontic appliances. The crosslinked polymer comprises a first repeating unit derived from a urethane (meth)acrylate oligomer and a second repeating unit derived from a vinyl or thiol monomer.
US 2016/0145392 A1 (TODA et al.) relates to an ene-thiol based curable composition including a certain thiol compound and an ene oligomere having an acyclic or aromatic ring structure and two more ethylenically unsatureated groups in the molecule with a number average molecular weight of 500 to 20,000 in terms of polystyrene. The composition can be cured by photopolymerization or thermal polymerization and is said to be useful e.g. as coating material, adhesive, sealing agent.
US 2014/0216649 A1 (Woods et al.) relates to a thiol-ene curing composition, which cure upon exposure to UV light and/or heat. The curable composition include a vinyl polymer bearing alkenyl or thiol terminal functional groups and a crosslinking agent having the opposing functionality.

SUMMARY

One object of the invention is to provide a radiation-curable composition which can be used for producing dental or orthodontic appliances such as clear tray aligners in a more efficient way, in particular by applying an additive-manufacturing technique.
It would also be desirable, if the 3-dim article obtained by the processing of the radiation-curable composition with an additive-manufacturing technique has adequate mechanical and/or physical properties. A high surface resolution of the obtained article would also be desirable.
The invention described in the present text addresses one or more of the above-mentioned objects.
In one embodiment the invention features a radiation-curable composition for use as construction material in an additive-manufacturing technique comprising a radiation-curing step, the radiation-curable composition comprising mercapto-functional Component A comprising at least three mercapto moieties, crosslinker Component B with at least three vinyl or allyl moieties, photo-initiator(s) Component C for initiating a curing reaction between Component A and Component B, wherein the radiation-curable composition does not comprise urethane (meth)acrylate oligomers in an amount of more than 4 wt. %.
A further embodiment of the invention is directed to a process of producing a 3-dim article by applying an additive-manufacturing technique comprising a radiation-curing step, the radiation-curable composition comprising mercapto-functional Component A comprising at least three mercapto moieties, crosslinker Component B with at least three vinyl or allyl moieties, photo-initiator(s) Component C for initiating a curing reaction between Component A and Component B, wherein the radiation-curable composition does not comprise urethane (meth)acrylate oligomers in an amount of more than 4 wt. % with respect to the amount of the whole composition.
In another embodiment, the invention relates to a 3-dim article obtained or obtainable by the processing of the radiation-curable composition with an additive-manufacturing technique.
The invention is also related to kit of parts comprising the radiation-curable composition described in the present text and additive-manufacturing equipment.
Moreover, the invention features the use of the radiation-curable composition described in the present text as manufacturing material in an additive-build up technique for producing dental or orthodontic appliances.
Unless defined differently, for this description the following terms shall have the given meaning:
The term "compound" or "component" is a chemical substance which has a certain molecular identity or is made of a mixture of such substances, e.g., polymeric substances.
A "hardenable component" or "polymerizable component" is any component which can be cured or solidified in the presence of a photo-initiator by radiation-induced polymerization. A hardenable component may contain only one, two, three or more polymerizable groups. Typical examples of polymerizable groups include unsaturated carbon groups, such as a vinyl group being present i.a. in a (methyl)acrylate group.

A "derivative" or "structural analogue" is a chemical compound showing a chemical structure closely related to the corresponding reference compound and containing all featured structural elements of the corresponding reference compound but having small modifications like bearing additional chemical groups like e.g. alkyl moieties, Br, Cl, or F or not bearing chemical groups like e.g. alkyl moieties in comparison to the corresponding reference compound. That is, a derivative is a structural analogue of the reference compound. A derivative of a chemical compound is a compound comprising the chemical structure of said chemical compound.

A "monomer" is any chemical substance which can be characterized by a chemical formula, bearing polymerizable groups (including (meth)acrylate groups) which can be polymerized to oligomers or polymers thereby increasing the molecular weight. The molecular weight of monomers can usually simply be calculated based on the chemical formula given.

An "oligomer" is a chemical substance composed of a low number of repeating units of monomers which are connected with each other by chemical bonds. The number of repeating units is typically in a range of 4 to 10 or 4 to 8.

"Polymer" or "polymeric material" are used interchangeably to refer to a homopolymer, copolymer, terpolymer etc, i.e. a component being composed of a large number of repeating units of monomers. The number of repeating units is typically more than 10.

A "mercapto moiety" means an —SH moiety.

A "vinyl moiety" means a —CH=CH$_2$ moiety.

An "allyl moiety" means a —CH$_2$—CH=CH$_2$ moiety.

"Alkyl" means an organic radical comprising 1 to 12 or 1 to 10 or 1 to 8 or 1 to 6 carbon atoms.

As used herein, "(meth)acryl" is a shorthand term referring to "acryl" and/or "methacryl". For example, a "(meth) acryloxy" group is a shorthand term referring to either an acryloxy group (i.e., CH$_2$=CH—C(O)—O—) and/or a methacryloxy group (i.e., CH$_2$=C(CH$_3$)—C(O)—O—).

As used herein, "hardening" or "curing" a composition are used interchangeably and refer to polymerization and/or crosslinking reactions including, for example, photopolymerization reactions and chemical polymerization techniques (e. g., ionic reactions or chemical reactions forming radicals effective to polymerize ethylenically unsaturated compounds) involving one or more materials included in the composition.

A "powder" means a dry, bulk material composed of a large number of fine particles that may flow freely when shaken or tilted.

A "particle" means a substance being a solid having a shape which can be geometrically determined. The shape can be regular or irregular. Particles can typically be analysed with respect to e.g. particle size and particle size distribution. A particle can comprise one or more crystallites. Thus, a particle can comprise one or more crystal phases.

A "photo-initiator" is a substance being able to start or initiate the curing process of a hardenable composition in the presence of radiation, in particular light (wave length from 300 to 700 nm).

A "transparent article" is an article being transparent, if inspected with the human eye, particularly an article which has a light transmission of at least 80% for a path length of 1 mm for light having a wave length of 500 nm. So, a picture can be seen through a platelet (1 mm thick) of such a transparent material.

A "solvent" means a liquid that can dissolve a solid or liquid.

"Additive-manufacturing" or "3d-printing" means processes comprising a radiation-curing step used to make 3-dimensional articles. An example of an additive-manufacturing technique is stereolithography (SLA) in which successive layers of material are laid down under computer control. The articles can be of almost any shape or geometry and are produced from a 3-dimensional model or other electronic data source.

The term "dental or orthodontic appliance" means any article which is to be used in the dental or orthodontic field.

Examples of dental or orthodontic appliances include tray aligners and mouth guards.

A dental or orthodontic appliance should not contain components which are detrimental to the patient's health and thus free of hazardous and toxic components being able to migrate out of the dental or orthodontic article.

A material or composition is "essentially or substantially free of" a certain component within the meaning of the invention, if the material or composition does not contain said component as an essential feature. Thus, said component is not willfully added to the composition or material either as such or in combination with other components or ingredient of other components. Ideally the composition or material does not contain the said component at all. However, sometimes the presence of a small amount of the said component is not avoidable e.g. due to impurities.

"Ambient conditions" mean the conditions which the composition described in the present text is usually subjected to during storage and handling. Ambient conditions may, for example, be a pressure of 900 to 1100 mbar, a temperature of 10 to 40° C. and a relative humidity of 10 to 100%. In the laboratory ambient conditions are typically adjusted to 20 to 25° C. and 1000 to 1025 mbar.

As used herein, "a", "an", "the", "at least one" and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

Adding an "(s)" to a term means that the term should include the singular and plural form. E.g. the term "additive(s)" means one additive and more additives (e.g. 2, 3, 4, etc.).

Unless otherwise indicated, all numbers expressing quantities of ingredients, measurement of physical properties such as described below and so forth used in the specification and claims are to be understood as being modified in all instances by the term "about".

The terms "comprise" or "contain" and variations thereof do not have a limiting meaning where these terms appear in the description and claims. The term "comprise" shall include also the terms "consist essentially of" and "consist of".

BRIEF DESCRIPTION OF FIGURES

FIG. 1 shows a 3-dim test specimen obtained by processing the radiation-curable composition described in the present text by an additive-manufacturing process.

DETAILED DESCRIPTION

The radiation-curable composition described in the text provides a couple of advantageous properties.

The radiation-curable composition can be easily processed with an additive-manufacturing technique and allows the production of 3-dim articles with adequate surface-resolution.

The obtained 3-dim article is essentially colourless and highly transparent. Further, despite the fact that the obtained 3-dim article is a polymeric substance obtained by polymerizing mercapto-functional components with vinyl or allyl-functional components, the 3-dim article does not have a negative olfactory impression. The obtained 3-dim article is essentially odourless.

The radiation-curable composition enables the practitioner to produce 3-dim articles having beneficial physical properties, like a sufficient tensile strength and an adequate elongation at break. Clear tray aligner products should not be too elastic. Otherwise, an adequate movement of the individual teeth during the treatment process cannot be effected.

It was also found that the 3-dim article has a low water-absorbing capacity. That is, the 3-dim article does not swell if brought in contact with water. This can be beneficial, if the 3-dim article is used as dental or orthodontic appliances, in particular as clear tray aligner which should not change its physical properties over time when brought in contact with water (e.g. saliva).

Due to the absence of high-viscous oligomers or prepolymers of urethan (meth)acrylates, the radiation-curable composition can also be processed with a high 3d-printing speed.

Further, due to the absence of high-viscous oligomers or prepolymer in the radiation-curable composition, uncured resin can be easier removed from the surface of a 3-dim article obtained by an additive-manufacturing technique such as SLA. Thus, the 3-dim article is easier to clean.

In summary, the radiation-curable composition described in the present text facilitates in particular the production of dental or orthodontic appliances with an additive-manufacturing technique, e.g. due to a higher printing speed and/or an easier and faster post processing process.

The radiation-curable composition described in the present text does not comprise urethane (meth)acrylate oligomers in an amount of more than 4 wt. %.

According to a further embodiment, the radiation-curable composition described in the present text does not comprise urethane (meth)acrylate in an amount of more than 4 wt. %.

If was found that the presence of urethane (meth)acylate oligomers or urethane (meth)acylate in general often has a negative impact on the overall processing time, in particular the time needed for post-processing the 3d-printed article after the printing process.

Urethane (meth)acrylates are typically comparably high viscous substances and are more difficult to process by using e.g. SLA technology. More importantly, these materials tend to stick or adhere to the surface of the 3d-printed article, when the 3d-printed article is removed from the printing vat of the 3d-printer. Removing these materials from the surface of the 3d-printed articles is often tedious and takes time.

This holds even more true, if higher molecular urethane (meth)acrylates are used, such as oligomers Thus, using a composition as described in the present text not containing urethane (meth)acrylate oligomers or urethane (meth)acrylate in an amount of more than 4 wt. % or more than 3 wt. % or 2 wt. % or 1 wt. % in an additive manufacturing process for producing 3-dim articles such as clear tray aligners is advantageous in particular from a post-processing perspective.

The radiation-curable composition comprises one or more mercapto-functional Components A. The mercapto-functional Component A comprises at least 3 mercapto moieties.

In contrast to using mercapto-functional components with only 2 mercapto moieties, using a mercapto-functional Component A comprising at least 3 mercapto moieties allows the formation of a higher crosslinked network after polymerization. Different kinds of mercapto-functional components can be used, if desired.

Generally, the mercapto-functional Component A may have the formula

$R^0-(SH)_n$, with $R^0$ being an organic radical which is preferably free from ethylenically unsaturated double bonds and n being an integer from 3 to 12 or 3 to 8 or 3 to 6 or 3 to 4.

Suitable mercapto-functional components are, for example, polyoxyalkylene triols with mercaptan end moieties.

Examples of such compounds have the general formula

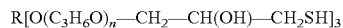
$R[O(C_3H_6O)_n-CH_2-CH(OH)-CH_2SH]_3$ wherein R denotes an aliphatic hydrocarbon radical having 1-12 C-atoms and n is an integer from 1 to 25, or

$R[O(C_3H_6O)_n-CH_2-CH(OH)-CH_2CH_2SH]_m$ wherein R denotes an aliphatic hydrocarbon radical having 1-12 C-atoms, n is an integer 1 or 2 and m is an integer 5 or 6.

Also useful are the esters of mercaptocarboxylic acids with at least trifunctional alcohols.

Examples of this compound class are the mercaptocarboxylic acid esters of trimethylol propane and of pentaerythrite. The mercaptocarboxylic acids used here have carbon skeletons having 2 to 20 C-atoms, preferably 5 to 15 C-atoms.

Suitable mercapto-functional components can also be described by the following formulas:

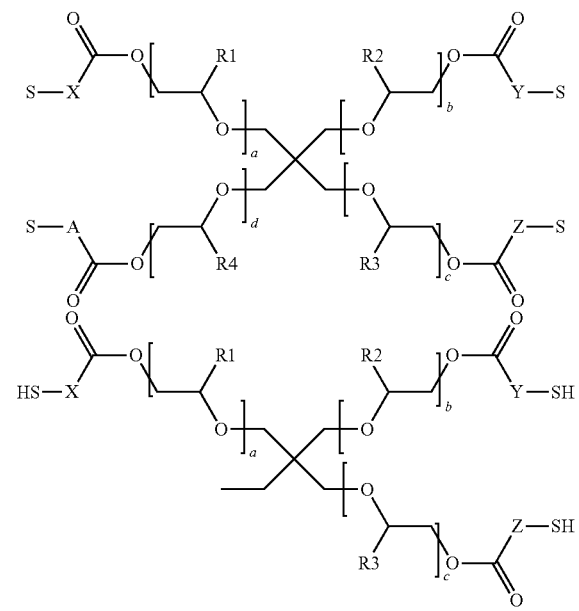

-continued

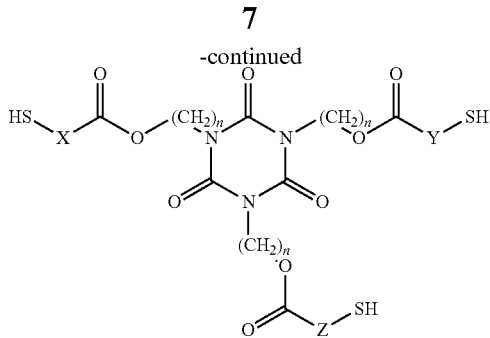

wherein
X, Y, Z, and A are each independently a linear or branched $C_1$-$C_{36}$ alkyl or alkylene, alkenyl or alkenylene, aryl or arylene, or heteroaryl or heteroarylene moiety;

$R^1$, $R^2$, $R^3$, and $R^4$ are each independently H or $CH_3$;

a, b, c, and d are each independently an integer from 0 to 100;

and n is an integer from 1 to 36.

For example, in some cases, one or more of X, Y, Z, and A is $CH_2$ or $CH_2CH_2$; and $R^1$, $R^2$, $R^3$, and $R^4$ are each H.

Non-limiting examples of mercapto-functional components include pentaerythritol tetra(3-mercaptopropionate) (PETMP), dipentaerythritol hexa(3-mercaptopropionate) (DiPETMP), trimethylol-propane tri(3-mercaptopropionate) (TMPMP), pentaerythritol tetramercaptoacetate (PETMA), trimethylol-propane trimercaptoacetate (TMPMA), ethoxylated trimethylolpropane tri(3-mercaptopropionate) (ETTMP), propyleneglycol 3-mercaptopropionate (PPGMP), tris[2-(3-mercaptopropionyloxy)ethyl]isocyanurate (TEMPIC), polycaprolactone tetra 3-mercaptopropionate, 2,3-di((2-mercaptoethyl)thio)-1-propane-thiol (DMPT), pentaerythritol tetrakis(3-mercaptobutylate), and 1,3,5-tris(3-mercaptobutyloxethyl)-1,3,5-triazine-2,4,6(1H,3H,5H)-trione.

The mercapto-functional component can also be a mercapto-functional polyorganosiloxane(s).

The mercapto-functional polyorganosiloxane(s) can be characterized by the following features alone or in combination:
fraction of (mercaptoalkyl)methylsiloxane units: 7 to 100 mol-%
molecular weight (Mn): 500 to 20,000 g/mol or 600 to 15,000 g/mol;
viscosity: from 10 to 1,000 mPa*s or from 20 to 750 mPa*s at 23° C.
Mercapto-functional polyorganosiloxanes having a fraction of (mercaptoalkyl)methylsiloxane units in the range of 70 to 100 are sometimes preferred.

Mercapto-functional polyorganosiloxane can be characterized by the following formula:

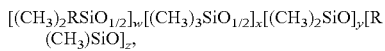

with w being from 0 to 0.1, x being from 0 to 0.1 and w+x being from 0.01 to 0.1; y being from 0 to 0.93, z being from 0.07 to 0.99, wherein each R is independently selected from a mercapto $C_{1-10}$ hydrocarbyl group.

These mercapto-functional polyorganosiloxanes comprise a high amount of mercapto moieties (e.g. in the range of 7 to 100 mol-%).

Examples of mercapto-functional polyorganosiloxanes include poly(mercaptobutyl)methylsiloxane, poly(mercaptopropyl)methylsiloxane, poly(mercaptoethyl)methylsiloxane, poly(mercaptomethyl)methylsiloxane, co-poly(mercaptopropyl)methylsiloxane dimethylsiloxane and mixtures thereof.

In addition to mercapto-functional polyorganosiloxanes comprising a high amount of mercapto moieties, the composition can also comprise polyorgansiloxane with a low amount of mercapto moieties.

Using a mixture of two different mercapto-functional polyorgansiloxanes may help to adjust the shore hardness of the cured composition.

Such polyorgansiloxane with a low amount of mercapto moieties are for example mercaptopropyldimethyl siloxoy end-capped polydimethylsiloxanes or copolymers according to the following formula:

$[(CH_3)_2RSiO_{1/2}]_a[(CH_3)_2SiO]_b$ with a=0.02-0.03 and R being a mercapto $C_{1-10}$ hydrocarbyl group.

Such a polyorganosiloxane typically comprises 2 to 3 mol-% of mercaptopropyldimethylsiloxy units.

Generally, the mercapto-functional Component A can typically be characterized by the following properties alone or in combination:
a) having a molecular weight in the range of 200 to 20,000 g/mol or 250 to 15,000 g/mol;
b) having a viscosity in the range of 1 to 1,000 mPa*s at 23° C.

For polymers, the molecular weight is typically given as number average molecular weight $M_n$. Methods for determining the molecular weight are known to the expert. If desired, the Mn can be determined by gel permeation chromatography (GPC) using a suitable solvent (e.g. tetrahydrofuran) and an appropriate polystyrene standard.

The mercapto-functional Component A is typically present in the following amount:
Lower amount: at least 20 or at least 25 wt. %;
Upper amount: at most 75 or at most 70 wt. %;
Range: 20 to 75 or 25 to 70 wt. %;
wt. % with respect to the weight of the whole composition.

The radiation-curable composition described in the present text comprises one or more crosslinker Components B. The crosslinker Component B comprises at least 3 vinyl or allyl moieties.

Crosslinker components comprising 3 ally moieties can be preferred, as these moieties may have a higher reactivity toward the mercapto moiety of Component A compared to vinyl moieties.

The poly-ene may for example have the following structure:

wherein m is at least 3, 4, 5 or 6,
and X is selected from the group consisting of

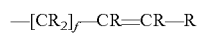

wherein f is an integer from 0 to 9
and R can have the meanings H, F, Cl, furyl, thienyl, pyridyl, phenyl and substituted phenyl, benzyl and substituted benzyl, alkyl and substituted alkyl, alkoxy and substituted alkoxy as well as cycloalkyl and substituted cycloalkyl and in each case may be the same or different,
and wherein (A) is an at least trifunctional organic radical which comprises the atoms selected from the group consisting of C, O, N, S, Si and H, with the proviso that urethane (meth)acrylate moieties or (meth)acrylate moieties are not comprised.

Suitable crosslinker components also include the allyl and/or vinyl esters of at least trifunctional carboxylic acids.

Suitable as carboxylic acids for this purpose are those with carbon chains of 2 to 20 C-atoms, preferably 5 to 15 C-atoms; also well-suited are allyl and vinyl esters of aromatic tricarboxylic acids such as citric acid, tri-mesic acid and tri-mellitic acid.

Suitable are also the allyl ethers of polyfunctional alcohols, for example polyether poly-ols, their copolymers or also copolymers of ethylene oxide and tetrahydrofuran. Preferred are sometimes the allyl ethers of trifunctional alcohols. Examples which can be named are the allyl ethers of trimethylol propane or pentaerythritol or 2,2-bis-oxyphenyl propane-bis-(diallyl phosphate).

Also well-suited are triallyl-functionalized compounds of the type cyanuric acid, triazine trione and the like, in particular 1,3,5-Triallyl-1,3,5-triazine-2,4,6(1H,3H,5H)-trione, and mixtures thereof.

The crosslinker Component B can typically be characterized by the following properties alone or in combination:
a) having a molecular weight in the range of 100 to 8,000 g/mol;
b) having a viscosity in the range of 0.1 to 10,000 mPa*s at 23° C.

The crosslinker Component B is typically present in the following amount:
Lower amount: at least 15 or at least 20 wt. %;
Upper amount: at most 65 or at most 60 wt. %;
Range: 15 to 65 or 20 to 65 wt. %;
wt. % with respect to the weight of the whole composition.

For obtaining good curing results, the following ratios were found to be useful:
the ratio of mercapto moieties in Component A to vinyl or allyl moieties in Component B being in the range of 1.5:1 to 1:1.5 with respect to mol; and/or
Component A and Component B being present in a ratio of 1.5:1 to 1:1.5 with respect to weight.

The radiation-curable composition described in the present text comprises one or more photo-initiator(s) as Component C.

The nature and structure of the photo-initiator is not particularly limited, unless the desired result cannot be achieved.

Using a photo-initiator being soluble in the radiation-curable resin composition of the present text is preferred.

The photo-initiator(s) has typically a light absorption band in a wave length range from 250 to 450 nm, preferably in the range from 300 to 450 nm or from 350 to 420 nm.

The photo-initiator is capable of generating free radicals for polymerization upon exposure to light energy having a wavelength between 250 and 450 nm.

The following class of photo-initiator(s) was found to be useful: one component system where two radicals are generated by cleavage.

Photo-initiators which can be used typically contain a moiety selected form benzoin ether, acetophenone, benzoyl oxime or acyl phosphine oxids, phenylglyoxate, □-hydroxyketones or □-aminoketones. In one embodiment, blends of at least two different photo-initiators are used.

Exemplary UV initiators include 1-hydroxycyclohexyl benzophenone (available, for example, under the trade designation "OMNIRAD™ 184" from IGM Resin B.V., Waalwijk, Netherlands), 4-(2-hydroxyethoxy)phenyl-(2-hydroxy-2-propyl) ketone (available, for example, under the trade designation "OMNIRAD™ 2959" from IGM Resin B.V), 2-hydroxy-2-methylpropiophenone (available, for example, under the trade designation "OMNIRAD™ 1173" from IGM Resin B.V.) and 2-benzyl-2-(N,N-dimethylamino)-1-(4-morpholinophenyl)-1-butanone (OMNIRAD™ 369, IGM Resins B.V.).

A particularly suitable class of photo-initiators include the class of acylphosphine oxides, as described e.g. in U.S. Pat. No. 4,737,593 (Elrich et al.).

Such acylphosphine oxides are of the general formula

$$(R^9)_2-P(=O)-C(=O)-R^{10} \qquad (5)$$

wherein each $R^9$ individually can be a hydrocarbyl group such as alkyl, cycloalkyl, aryl, and aralkyl, any of which can be substituted with a halo-, alkyl- or alkoxy-group, or the two $R^9$ groups can be joined to form a ring along with the phosphorous atom, and wherein $R^{10}$ is a hydrocarbyl group, an S-, O-, or N-containing five- or six-membered heterocyclic group, or a $-Z-C(=O)-P(=O)-(R^9)_2$ group, wherein Z represents a divalent hydrocarbyl group such as alkylene or phenylene having from 2 to 6 carbon atoms.

Preferred acylphosphine oxides are those in which the $R^9$ and $R^{10}$ groups are phenyl or lower alkyl- or lower alkoxy-substituted phenyl. By "lower alkyl" and "lower alkoxy" is meant such groups having from 1 to 4 carbon atoms.

A preferred acylphosphine oxide is bis(2,4,6-trimethylbenzoyl)phenyl phosphine oxide (OMNIRAD™ 819, IGM Resin B.V., Waalwijk, Netherlands).

In another embodiment, it is preferred to use liquid blends of acylphosphine oxides with at least one other photo-initiator (available e.g. as OMNIRAD™ 1000, OMNIRAD™ 2022, OMNIRAD™ 2100 or OMNIRAD™ 4265, IGM Resin B.V., Waalwijk, Netherlands).

Tertiary amine reducing agents may be used in combination with an acylphosphine oxide. Illustrative tertiary amines include ethyl 4-(N,N-dimethylamino)benzoate and N,N-dimethylaminoethyl methacrylate.

Also useful are photo-initiators comprising an alpha, beta-triketon moiety or comprising an alpha-diketon dialkyl ketal moiety.

The photo-initiator(s) is typically present in the following amounts:
Lower amount: at least 0.01 or at least 0.05 or at least 0.1 wt. %;
Upper amount: at most 2 or at most 1.5 or at most 1 wt. %;
Range: 0.01 to 2 or 0.01 to 0.5 wt. % or 0.1 to 1 wt. %;
wt. % with respect to the weight of the whole composition.

According to certain embodiments, the radiation-curable composition described in the present text further comprises an UV radiation absorbing component.

Adding an UV radiation absorbing component can be beneficial for reducing the risk of "over-curing" during the processing of the radiation-curable composition with an additive-manufacturing technique.

Suitable UV radiation absorbing components often contain one of the following moieties: benzophenone, benzotriazole, triazine.

Hindered amine light stabilizers (HALS) can also be used, if desired.

UV radiation absorbing components which can be used include products commercialized under the trade designations Tinuvin™, Chimasorb™, Irgastab™ and mixtures thereof.

There is no need for UV radiation absorbing components to be present. However, if present, the UV radiation absorbing component is present in the following amounts:
Lower amount: at least 0.01 or at least 0.05 or at least 0.1 wt. %;

Upper amount: at most 2 or at most 1 or at most 0.5 wt. %;

Range: 0.01 to 2 or 0.05 to 2 wt. % or 0.1 to 0.5 wt. %; wt. % with respect to the weight of the whole composition.

The radiation-curable composition described in the present text may further comprises filler(s).

Using a small amount of filler might help to improve or adjust the mechanical properties of the 3-dim article obtained after during the radiation-curable composition described in the present text.

Adding a too high amount of filler is typically not intended as this may lead to an undesired light scattering during the curing process, in particular, if the 3-dim article is produced with an additive-manufacturing technique, such as SLA.

A too high amount of filler may also have an undesired impact on the translucency of the 3-dim article.

E.g, if the 3-dim article is to be used as a clear tray aligner in the mouth of a patient, the 3-dim article should be sufficient translucent, so that the tooth structure to be aligned is still visible during the treatment process.

According to one embodiment, the filler(s) comprises agglomerated nano-sized particles.

Nano-filler(s) comprising agglomerated nano-sized particles are typically characterized by at the following features alone or in combination:
Specific surface: (BET according to Brunauer, Emmet and Teller): from 30 to 400 or 50 to 300 or from 70 to 250 $m^2/g$;
comprising particles of $SiO_2$, $ZrO_2$, $Al_2O_3$ and mixtures thereof.

Suitable agglomerated nanoparticles include fumed silicas such as products sold under the tradename Aerosil™ e.g. Aerosil™ OX-130, -150, and -200, Aerosil™ R8200 available from Degussa AG, (Hanau, Germany), CAB-O-SIL™ M5 available from Cabot Corp (Tuscola, Ill.), and HDK™, e.g. HDK-H 2000, HDK H15; HDK H18, HDK $H_2O$ and HDK H30 available from Wacker.

There is no need for filler(s) to be present. However, if present, the filler(s) is typically present in the following amounts:
Lower limit: at least 0.01 or at least 0.1 or at least 0.5 wt. %;
Upper limit: utmost 5 or utmost 4 or utmost 2 wt. %;
Range: 0.01 to 5 or 0.1 to 4 or 0.5 to 2 wt. %;
wt. % with respect to the whole composition.

The radiation-curable composition described in the present text may further comprise solvent(s).

Solvents may be used for adjusting the viscosity of the radiation-curable composition or for dissolving individual components in the composition like photo-initiators or stabilizers.

Solvent(s) which can be used include polyethylene glycol (e.g. PEG 400), polypropylene glycol, co-polymers of polyethylene glycol and polypropylene glycol, dimethylformamide, butyl acetate, toluene, xylol, benzyl alcohol.

There is no need for solvent(s) to be present. However, if present, the solvent(s) is typically present in the following amounts:
Lower limit: at least 0.1 or at least 0.3 or at least 0.5 wt. %;
Upper limit: utmost 15 or utmost 12 or utmost 10 wt. %;
Range: 0.1 to 15 or 0.3 to 12 or 0.5 to 10 wt. %;
wt. % with respect to the whole composition.

The radiation-curable composition described in the present text may further comprises stabilizer(s).

A stabilizer may extend the shelf life of the curable composition, help prevent undesired side reactions, and adjust the polymerization process of the radiation-curable component(s) present in the curable composition.

Adding one or more stabilizer(s) to the curable composition may further help to improving the accuracy or detail resolution of the surface of the 3-dim article to be produced.

Stabilizer(s) which can be used often comprise a phenol moiety or phosphonic acid moieties.

Specific examples of stabilizer(s) which can be used include: p-methoxyphenol (MOP), hydroquinone monomethylether (MEHQ), 2,6-di-tert-butyl-4-methyl-phenol (BHT; Ionol), phenothiazine, 2,2,6,6-tetramethyl-piperidine-1-oxyl radical (TEMPO) Vitamin E; N,N'-di-2-butyl-1,4-phenylenediamine; N,N'-di-2-butyl-1,4-phenylenediamine; 2,6-di-tert-butyl-4-methylphenol; 2,4-dimethyl-6-tert-butylphenol; 2,4-dimethyl-6-tert-butylphenol and 2,6-di-tert-butyl-4-methylphenol; 2,6-di-tert-butylphenol; pentaerythritoltetrakis(3-(3,5-di-tert-butyl-4-hydroxyphenyl)propionate) (Irganox™ 1010); octyl-3,5-di-tert-butyl-4-hydroxy-hydrocinnamate; Octadecyl 3-(3,5-di-tert-butyl-4-hydroxyphenyl)propionate; 1,3,5-trimethyl-2,4,6-tris(3,5-di-tert-butyl-4-hydroxy-benzyl)benzene; 2,2',4,4-tetrakis-tert-butyl-3,3'-dihydroxybiphenyl; 4,4-butylidenebis(6-tert-butyl-m-cresol); 4,4'-isopropyliden-bis-(2-tert-butylphenol); 2,2'-methylenebis(6-nonyl-p-cresol); 1,3,5-tris(3,5-di-tert-butyl-4-hydroxybenzyl+1,3,5-triazine-2,4,6 (1H,3H,5H)trione; pyrogallol; N-nitroso-N-phenylhydroxylamine; 3-propenylphenol, phenothiazine, N-Phenyl-2-naphthylamine, or mixtures thereof.

There is no need for stabilizer(s) to be present. However, if present, the stabilizer(s) is typically present in the following amounts:
Lower amount: at least 0.001 or at least 0.005 or at least 0.01 wt. %;
Upper amount: at most 0.1 or at most 0.1 or at most 1 wt. %;
Range: 0.001 to 1 or 0.005 to 0.1 wt. %, or 0.01 to 0.1 wt. % with respect to the weight of the curable composition.

In certain embodiments, the radiation-curable composition described in the present text typically is characterized by the following properties alone or in combination:
a) viscosity: less than 200 Pa*s or less than 100 Pa*s or less than 50 Pa*s at 23° C.;
b) pH value: 5 to 9, e.g. if the curable composition is brought in contact with wet pH sensitive paper;
c) radiation-curable with light having a wavelength in the range of 350 to 420 nm;
d) colour: light yellow or colourless.

In certain embodiments, the combination of the following features is sometimes preferred: a), b) and c) or a), c) and d).

If desired, the properties can be determined as described in the example section.

The radiation-curable composition typically comprises the components in the following amounts:
Mercapto-functional component(s): 20 to 75 wt. %,
Crosslinker component(s): 15 to 65 wt. %,
Photo-initiator(s): 0.01 to 2 wt. %,
UV radiation absorbing component(s): 0.01 to 2 wt. %,
Solvent(s): 0 to 15 wt. %,
Dye(s): 0 to 1 wt. %,
Filler(s): 0 to 5 wt. %,
Stabilizer(s): 0 to 1 wt. %.

According to certain embodiments, the radiation-curable composition described in the present text does typically not comprise the following component(s) alone or in combination:

Pt-catalyst, in an amount of more than 0.00001 wt. % calculated with respect to the weight of Pt;
organic dye(s) in an amount of more than 0.5 wt. %;
inorganic pigment(s) in an amount of more than 0.5 wt. %;
wt. % with respect to the whole composition.

According to certain embodiments, the radiation-curable composition does not comprise the following components alone or in combination:
  urethane (meth)acrylate component(s) in an amount of more than 4 wt. % or more than 2 wt. % or more than 1 wt. %;
  (meth)acylate oligomers in an amount of more than 4 wt. % or more than 2 wt. % or more than 1 wt. %;
  (meth)acylate in an amount of more than 4 wt. % or more than 2 wt % or more than 1 wt. %;
  components comprising epoxy moieties in an amount of more than 5 wt. % or more than 2 wt. % or more than 1 wt. %.

Thus, the radiation-curable composition can be essentially free of any of these components.

The radiation-curable composition described in the present text can be produced by mixing the respective components, particularly under save light conditions. If desired, a speed mixer can be used.

Typically, Component A is provided first. The other components are added as desired.

The radiation-curable composition described in the present text is particularly useful for producing a 3-dim article by processing the radiation-curable composition in an additive-manufacturing process comprising a radiation-curing step, in particular an SLA process. As a result, a transparent 3-dim article is obtained.

Such a process typically comprises the following steps:
  providing a layer of the radiation-curable composition on a surface,
  radiation-curing those parts of the layer of the radiation-curable composition which will belong to the 3-dim article to be produced,
  providing an additional layer of the radiation-curable composition in contact with the radiation cured surface of the previous layer,
  repeating the previous steps until a 3-dim article is obtained.

Such a process comprises the step of applying radiation to the surface of a radiation-curable material, wherein the radiation is applied only to those parts of the surface which will later form a part of the article to be produced.

Radiation can be applied by using e.g. a laser beam or by mask-image projection. Using a mask-image projection based stereolithographie process (MIP-SL) is sometimes preferred, as it allows a more rapid manufacturing of the article.

An MIP-SL process can be described as follows:
  i. A three-dimensional digital model of the article to be produced is provided.
  ii. The three-dimensional digital model is sliced by a set of horizontal planes.
  iii. Each thin slice is converted into a two-dimensional mask image.
  iv. The mask image is then projected with the aid of a radiation source onto the surface of the radiation-curable material being located in a building platform (e.g. having the shape of a vat).
  v. The radiation-curable material is only cured in those regions which are exposed.
  vi. The building platform containing the radiation-curable material or the layer of cured material is moved relative to the radiation source, wherein a new layer of radiation-curable material is provided being in contact with the layer of the cured material produced in the previous step.
  vii. Steps (iv) to (vi) are repeated until the desired article is formed.

Projecting the mask image on the radiation-curable material can be done either top-down or bottom-up with respect to the orientation of the vat.

Using the bottom-up technique can be beneficial as less radiation-curable material is needed.

It was found that the radiation-curable composition described in the present text is in particular useful for processing it in a mask-image projection stereolithography process using the bottom-up projection technique.

The 3d-printing process is typically followed by a post-processing treatment.

The post-processing treatment typically comprises the steps of removing residues of uncured composition from the surface of the 3-dim article.

The removal can be done, e.g. with the use of solvents like methanol, ethanol or iso-propanol.

If desired, a post-curing step might be applied to the 3-dim article. Such a post-curing step may result in a 3-dim article with better physical and/or mechanical properties such as tensile strength and elongation at break.

A post-curing step can be done with e.g. a light polymerization device such as Otoflash™.

The radiation-curable composition described in the present text can be used for producing a 3-dim article.

The 3-dim article obtained by curing the radiation-curable composition can typically be characterized by the following features alone or in combination:
  a) tensile strength: 5 to 100 MPa or 10 to 60 MPa according to DIN EN ISO 527-1:2012-06;
  b) elongation at break: 2 to 80% or 4 to 50% according to DIN EN ISO 527-1:2012-06;
  c) color: light yellow or colourless;
  d) being transparent;
  e) light transmission: at least 80% for a path length of 1 mm for light having a wave length of 500 nm;
  f) water absorption: less than 2%;
  g) glass transition temperature: above 40° C.

Thus, the 3-dim article is not rubber-elastic.

A combination of the following features is sometimes preferred: a) and b); or a), b) and d); or a), b), and e); or e), f) and g).

The above mechanical and/or physical properties refer to the 3-dim article obtained after a post-processing step has been conducted, which typically includes a cleaning and post-curing step.

The 3-dim article which can be produced by processing the radiation-curable composition described in the present text with an additive-manufacturing technique may have any desirable shape.

The radiation-curable composition described in the present text is in particular useful for producing 3-dim articles having the shape of protection mask, shock absorber, seals or orthodontic and dental appliances.

Dental or orthodontic appliances include clear tray aligners, night guards, mouth guards and parts thereof.

Clear tray aligners can straighten a dental patient's teeth without the need for using wires and brackets of traditional braces. The aligners typically consist of a sequence of clear, removable trays that fit over the teeth to straighten them. Currently, clear tray aligners are typically made by thermoforming.

During storage, the composition described in the present text is typically packaged in a suitable packaging device.

The curable composition described in the present text is typically stored in container. Suitable containers include vessels, foil bags, cartridges, etc.

The volume of the respective containers is not particularly limited, but is typically in a range of 2 to 200,000 ml or 5 to 100,000 ml or 10 to 50,000 ml.

The invention also relates to a kit of parts comprising the radiation-curable composition described in the present text and either of the following components alone or in combination:
  additive-manufacturing equipment, preferably selected from a stereolithographic printer,
  optionally an instruction of use containing processing parameters for the additive-manufacturing equipment.
Additional embodiments are described below:

Embodiment 1

A radiation-curable composition for use as construction material in an additive-manufacturing technique comprising a radiation-curing step for producing dental clear tray aligners as described in any of the preceding claims, the radiation-curable composition comprising
  mercapto-functional Component A comprising at least 3 mercapto moieties,
  crosslinker Component B with at least 3 vinyl or allyl moieties,
  photo-initiator(s) component C for initiating a curing reaction between Component A and Component B, the photo-initiator comprising a phosphine-oxide moiety,
  UV radiation absorbing component,
  the radiation-curable composition not comprising urethane (meth)acrylate in an amount of more than 4 wt. %, wt. % with respect to the weight of the whole composition,
the radiation-curable composition having a viscosity less than 100 Pa*s at 23° C.

Embodiment 2

A radiation-curable composition for use as construction material in an additive-manufacturing technique comprising a radiation-curing step, the radiation-curable composition comprising
  mercapto-functional Component A comprising at least 3 mercapto moieties,
  crosslinker Component B with at least 3 vinyl or allyl moieties,
  photo-initiator(s) component C for initiating a curing reaction between Component A and Component B, the photo-initiator comprising a phosphine-oxide moiety,
  UV radiation absorbing component,
  the radiation-curable composition not comprising urethane (meth)acrylate in an amount of more than 4 wt. %, wt. % with respect to the weight of the whole composition,
  the ratio of mercapto moieties to vinyl or allyl moieties being in the range of 1.5:1 to 1:1.5 with respect to mol,
the radiation-curable composition having a viscosity less than 50 Pa*s at 23° C.

Embodiment 3

A radiation-curable composition for use as construction material in an additive-manufacturing technique comprising a radiation-curing step, the radiation-curable composition comprising
  mercapto-functional Component A comprising at least 3 mercapto moieties,
  crosslinker Component B with at least 3 vinyl or allyl moieties,
  photo-initiator(s) component C for initiating a curing reaction between Component A and Component B, the photo-initiator comprising a phosphine-oxide moiety,
  UV radiation absorbing component,
  the radiation-curable composition not comprising (meth)acrylate oligomer(s) in an amount of more than 4 wt. %, wt. % with respect to the weight of the whole composition,
  the ratio of mercapto moieties to vinyl or allyl moieties being in the range of 1.5:1 to 1:1.5 with respect to mol,
  the radiation-curable composition having a viscosity less than 50 Pa*s at 23° C.

Embodiment 4

A radiation-curable composition for use as construction material in an additive-manufacturing technique comprising a radiation-curing step, the radiation-curable composition comprising
  mercapto-functional Component A comprising at least 3 mercapto moieties,
  crosslinker Component B with at least 3 vinyl or allyl moieties,
  photo-initiator(s) component C for initiating a curing reaction between Component A and Component B, the photo-initiator comprising a phosphine-oxide moiety,
  UV radiation absorbing component,
  the radiation-curable composition not comprising (meth)acrylate in an amount of more than 4 wt. %, wt. % with respect to the weight of the whole composition,
  the ratio of mercapto moieties to vinyl or allyl moieties being in the range of 1.5:1 to 1:1.5 with respect to mol,
the radiation-curable composition having a viscosity less than 50 Pa*s at 23° C.

Embodiment 5

A 3-dim article having the shape of a dental clear tray aligner comprising a polymer obtained by polymerizing a radiation-curable composition with the aid of an additive-manufacturing technique comprising a radiation step, the radiation-curable composition comprising
  mercapto-functional Component A comprising at least 3 mercapto moieties,
  crosslinker Component B with at least 3 vinyl or allyl moieties,
  photo-initiator(s) component C for initiating a curing reaction between Component A and Component B, the photo-initiator comprising a phosphine-oxide moiety,
  UV radiation absorbing component in an amount of 0.01 to 2 wt. %,
  the radiation-curable composition not comprising urethane (meth)acrylate oligomer(s) in an amount of more than 4 wt. %, wt. % with respect to the weight of the whole composition,
  the ratio of mercapto moieties to vinyl or allyl moieties being in the range of 1.5:1 to 1:1.5 with respect to mol, the radiation-curable composition having a viscosity less than 100 Pa*s at 23° C., the 3-dim article being characterized by the following features:
- being transparent,
- having a tensile strength of 5 to 55 MPa according to DIN/EN 53504 (2017-03).
- having an elongation at break of 10 to 50% according to DIN/EN 53504 (2017-03).

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. The above specification, examples and data provide a description of the manufacture and use of the compositions and methods of the invention. The invention is not limited to the embodiments disclosed herein. One skilled in the art will appreciate that many alternative embodiments of the invention can be made without departing from the spirit and scope of thereof.

The following examples are given to illustrate the invention.

EXAMPLES

Unless otherwise indicated, all parts and percentages are on a weight basis, all water is de-ionized water, and all molecular weights are weight average molecular weight. Moreover, unless otherwise indicated all experiments were conducted at ambient conditions (23° C.; 1013 mbar).

Methods

Viscosity

If desired, the viscosity can be measured at 23° C. using a ThermoHaake Rotovisco 1 device with a plate/plate system (diameter 20 mm) and a slit of 0.1 mm. The viscosity values (Pa*s) and share stress values (Pa) can be recorded for each share rate (starting from 10 l/s to 100 l/s in 10 l/s steps. For each share rate, a delay of 5 seconds was used before collecting data. The above-mentioned method of measurement corresponds essentially to DIN 53018-1.

Glass Transition Temperature

If desired, the glass transition temperature can be determined by means of Differential Scanning calorimetry according to DIN EN ISO 11357-1:2017-02.

Water Absorption

If desired, the water absorption can be measured according to ISO 62:2008-05. This test is modified to meet the requirements in the application of 3d-printed articles in dentistry by fully curing and not drying the specimens. Instead of drying the specimens are stored in 50% rel. humidity and 23° C. for 24 hours.

Tensile Strength (TS) and Elongation at Break (EB)

If desired, the tensile strength and elongation of the compositions can be determined according to DIN EN ISO 527-1:2012-06. The tensile strength is given in MPa and the elongation in % of the original length. Tensile strength and elongation data were evaluated on a Zwick Z010 Universal testing machine, by tearing at least three I-shaped specimens of the following dimensions: Central unit: 10 mm×2 mm×2 mm; Overall length: 25 mm; Wider part width: 5 m; Radius of rounded edges: R=1 mm on the central unit; 25 mm on the wider part.

The pastes were filled into a brass mould and section-wise light-cured on both sides at 23° C. using a curing light with 395 nm LED and a power of 630 mW/cm². The specimens were removed directly after the end of light-curing and put into an Otoflash™ device under argon atmosphere for 1000 flashes. The measurements were performed at a Crosshead speed of 200 mm/min.

Printability in a Stereolithography Process

To determine the usability of a formulation in a stereolithographic additive-manufacturing process (SLA), a test specimen as shown in FIG. 1 was prepared according the following general procedure:

Compositions are processes in a DLP/SLA 3D-printer (Rapid Shape S30) at room temperature (23° C.) and 50% humidity to produce test specimen to check the detail accuracy of the resulting printed elastomers.

The following parameters are applied: light polymerization using an LED-lamp: 405 nm, 5 W/cm², separation gap: 2.5 mm, light exposure time: variable from 20 to 0.5 s, layer thickness 50 μm.

The specimens are cleaned in an ultrasonic bath filled with iso-propanol for 5 min and post-processed using an Otoflash™ light polymerization chamber at 2000 flashes in argon atmosphere.

To determine a suitable light exposure time for the test compositions, the light exposure times are varied though the printing process of the test specimen.

If the detail accuracy of the test specimen—determined by the number of sharp printed edges visible—was sufficient, a proper light exposure time can be selected for further printing of 3d articles.

The design of the test specimen showed several edges and notches of different width and height.

The printability of a composition in an SLA process was rated by the number of clearly visible edges of the printed test specimen according to Table 1. The test specimen had the dimensions 25×6 mm×20 mm and consisted of edges and notches of constantly reducing size and distance to each other from 2.0×2.0 mm to 1.0×0.04 mm. A sample of such a test specimen is shown in FIG. 1.

TABLE 1

| Clearly visible edges | Rating |
|---|---|
| <5 | -- |
| 5-7 | - |
| 8-10 | + |
| >10 | ++ |

Post Curing Efficiency (PCE)

To determine the effort for the cleaning step in the post processing of 3-dim articles produced in an additive manufacturing process, the amount of liquid residue on the printed articles is measured.

The material to be tested is filled into a round plastic mould having an inner diameter of 15 mm and a thickness of 1.5 mm. The mould is covered with clear PET foils and light cured for 20 seconds from both sides using a curing light containing 395 nm LED with a power of 630 mW/cm².

The specimen is removed from the mold and the weight of the specimen is determined on an analytical scale (±0.0002 g). The specimen is placed into the liquid material to be tested so that it is fully covered by liquid for 20 sec. The specimen is then removed from the liquid and held vertically in an upright position for 1 min±2 sec. to let the residue liquid drop of the specimen.

Then the mass of the specimen including the residual liquid is measured and the amount of the residual liquid is calculated in grams.

Materials

| Materials | | |
|---|---|---|
| Component | Source | Function |
| Pentaerythritol tetrakis Mercaptopropionate | Aldrich | Thiol Monomer |
| 1,3,5-Triallyl-1,3,5-triazine-2,4,6(1H,3H,5H)-trione | Aldrich | Allyl Monomer |
| Poly(mercaptopropyl)methylsiloxane (75-100 cSt) | ABCR | Thiol Monomer |
| Trimethylolpropane tris(3-mercaptopropionate) | Aldrich | Thiol Monomer |
| Omnirad ™ 2022: bis(2,4,6-trimethylbenzoyl)-phenylphosphineoxide/2-hydroxy-2-methyl-1-phenyl-propan-1-one | IGM Resins | Radical Initiator |
| Lucirin ™ TPO: Ethyl (2,4,6-trimethylbenzoyl) phenylphosphinate | IGM Resins | Radical Initiator |
| Bisphenol-A Diallylether | own synthesis | Allyl Monomer |
| Tinuvin ™ 326 | BASF | Radiation absorbing substance |
| Aerosil ™ R202 | Evonik | Filler |
| Exothane ™ 108 | Esstech | Urethane acrylate Monomer |

Preparation

All Compositions can be mixed at ambient conditions on a magnetic stirrer for 30 min. Afterwards the Mixtures are homogenized in a Vacuum-Speedmixer DAC600-V for 4 min under Vacuum.

| | Weight % | | | | | | |
|---|---|---|---|---|---|---|---|
| | Ex. 1 | Ex. 2 | CE 3 | CE 4 | Ex. 5 | Ex. 6 | Ex. 7 |
| Pentaerythritol tetrakis Mercaptopropionate | 49.6 | 59.4 | 49.5 | 45.2 | 50.0 | | 30.4 |
| Poly(mercaptopropyl) methylsiloxane 75-100 cSt | | | | | | 60.3 | |
| Trimethylolpropane tris(3-mercaptopropionate) | | | | | | | 30.4 |
| 1,3,5-Triallyl-1,3,5-triazine-2,4,6(1H,3H,5H)-trione | 49.7 | 40.1 | | 24.8 | 25.0 | 37.2 | |
| Omnirad 2022 | | | 1.0 | | 1.0 | 0.5 | 0.5 |
| Lucirin TPO | 0.25 | 0.5 | | 0.5 | | | |
| Bisphenol-A Diallylether | | | 49.5 | | 24.0 | | |
| Tinuvin 326 | 0.20 | | | | | | |
| Exothane 108 | | | | 30.0 | | | |
| Aerosil R202 | | | | | | 2.0 | |
| TS [Mpa] | 18.6 | 36.3 | n.d.* | 23.1 | 19.4 | 24.5 | 35.1 |
| EB [%] | 22.5 | 31.8 | n.d.* | 117 | 53.6 | 30.6 | 32.4 |
| PCE [mg] | 79 | 67 | n.d. | 162 | 50 | 92 | 43 |

*The material in Example CE3 was too elastic to be measured according to tensile strength measurement described herein.

What is claimed is:

1. A process of producing a cured 3-dimensional article, the process comprising the step of processing a radiation-curable composition with an additive-manufacturing technique comprising a radiation-curing step,
  the radiation-curable composition comprising
    mercapto-functional Component A comprising at least three mercapto moieties,
    crosslinker Component B with at least three vinyl or allyl moieties,
    photo-initiator(s) Component C for initiating a curing reaction between Component A and Component B,
  wherein the radiation-curable composition does not comprise urethane (meth)acrylate oligomers in an amount of more than 4 wt. % with respect to the weight of the whole composition.

2. The process according claim 1, the ratio of mercapto moieties to vinyl or allyl moieties being in the range of 1.5:1 to 1:1.5 with respect to moles.

3. The process according to claim 1, Component A and Component B being present in a ratio of 1.5:1 to 1:1.5 with respect to weight.

4. The process according to claim 1, the mercapto-functional component being characterized by the following features alone or in combination:
  having a molecular weight $M_n$ in the range of 200 to 20,000 g/mol;
  having a viscosity in the range of 1 to 1,000 Pa*s at 23° C.

5. The process according to claim 1, the crosslinker being characterized by the following features alone or in combination:
  having a molecular weight in the range of 100 to 5,000 g/mol;
  having a viscosity in the range of 0.1 to 10,000 Pa*s at 23° C.

6. The process according to claim 1 comprising
  mercapto-functional Component A in an amount of 20 to 75 wt. %,
  crosslinker Component B in an amount of 15 to 65 wt. %,
  photo-initiator Component C in an amount of 0.01 to 2 wt. %,
  wt. % with respect to the weight of the whole composition.

7. The process according to claim 1, the radiation-curable composition comprising in addition the following components alone or in combination:
  UV radiation absorbing component(s), in an amount of 0.01 to 2 wt. %;
  filler(s), in an amount of 0.1 to 5 wt. %;
  solvent(s), in an amount of 0.1 to 15 wt. %;
  stabilizer(s), in an amount of 0.001 to 1 wt. %;
  wt. % with respect to the weight of the whole composition.

8. The process according to claim 1, the radiation-curable composition not comprising the following components alone or in combination
  (meth)acrylate oligomer(s) in an amount of more than 4 wt. %;
  (meth)acrylate component(s) in an amount of more than 4 wt. %;
  wt. % with respect to the weight of the whole composition.

9. The process according to claim 1, the radiation-curable composition being characterized by the following features alone or in combination:
  viscosity: less than 200 Pa*s at 23° C.;
  colour: light yellow or colourless;
  light transmission: greater than 90% for a path length of 1 mm using light having a wave length of 500 nm.

10. The process according to claim 1, the cured 3-dimensional article obtainable or obtained by radiation-curing the radiation-curable composition being characterized by the following features alone or in combination:
  being transparent;
  light transmission: at least 80% for a path length of 1 mm for light having a wave length of 500 nm;
  tensile strength: 5 to 100 MPa according to DIN EN ISO 527-1:2012-06;
  elongation at break: 2 to 80% according to DIN EN ISO 527-1:2012-06;

water absorption: less than 2%;
glass transition temperature: above 40° C.

11. The process according to claim 1, wherein the 3-dimensional article has the shape of a protection mask, shock absorber, sealing ring, orthodontic or dental appliances.

12. The process according to claim 1, wherein the 3-dimensional article has the shape of a dental clear tray aligner,
the radiation-curable composition comprising
mercapto-functional Component A comprising at least three mercapto moieties,
crosslinker Component B with at least three vinyl or allyl moieties,
photo-initiator(s) component C for initiating a curing reaction between Component A and Component B, the photo-initiator comprising a phosphine-oxide moiety,
UV radiation absorbing component,
the radiation-curable composition not comprising urethane (meth)acrylate oligomer(s) in an amount of more than 4 wt. %, wt. % with respect to the weight of the whole composition, the radiation-curable composition having a viscosity less than 100 Pa*s at 23° C.

13. A kit of parts comprising
the radiation-curable composition as described in claim 1,
additive-manufacturing equipment, selected from a stereolithographic printer,
optionally an instruction of use containing processing parameters for the additive-manufacturing equipment.

\* \* \* \* \*

UNITED STATES PATENT AND TRADEMARK OFFICE
CERTIFICATE OF CORRECTION

| | |
|---|---|
| PATENT NO. | : 11,591,438 B2 |
| APPLICATION NO. | : 17/056189 |
| DATED | : February 28, 2023 |
| INVENTOR(S) | : Henning Hoffmann et al. |

It is certified that error appears in the above-identified patent and that said Letters Patent is hereby corrected as shown below:

In the Claims

Column 20
Line 5, In Claim 2, after "process according", insert --to--.

Signed and Sealed this
Eighteenth Day of July, 2023

Katherine Kelly Vidal
*Director of the United States Patent and Trademark Office*